United States Patent [19]

Golder et al.

[11] Patent Number: 5,114,998
[45] Date of Patent: May 19, 1992

[54] STABILIZED TALC-FILLED POLYESTER COMPOSITIONS

[75] Inventors: Michael D. Golder, Allendale, N.J.; David K. Walker, Union, Ky.

[73] Assignee: Hoechst Celanese Corp., Somerville, N.J.

[21] Appl. No.: 623,078

[22] Filed: Dec. 6, 1990

[51] Int. Cl.$^5$ .................. C08K 5/17; C08L 67/02
[52] U.S. Cl. .................. 523/508; 524/451; 524/513; 524/258
[58] Field of Search .............. 524/451, 513, 258; 523/508

[56] References Cited

U.S. PATENT DOCUMENTS

| | | | |
|---|---|---|---|
| 3,859,246 | 1/1975 | Jackson, Jr. et al. | 260/40 R |
| 3,968,183 | 7/1976 | Hayashi et al. | 260/860 |
| 4,125,571 | 11/1978 | Scott et al. | 260/860 |
| 4,140,669 | 2/1979 | Phipps, Jr. et al. | 260/40 R |
| 4,277,391 | 7/1981 | Charles | 524/258 |
| 4,290,937 | 9/1981 | Cohen | 260/40 R |
| 4,421,888 | 12/1983 | Okada | 524/371 |
| 4,460,731 | 7/1984 | Kochanowski et al. | 524/451 |
| 4,520,148 | 5/1985 | Golder | 524/100 |
| 4,520,149 | 5/1985 | Golder | 524/100 |
| 4,520,150 | 5/1985 | Golder | 524/100 |
| 4,607,075 | 8/1986 | Baum et al. | 524/451 |
| 4,661,546 | 4/1987 | Abu-Isa et al. | 524/153 |
| 4,699,942 | 10/1987 | Weaver et al. | 524/338 |
| 4,731,407 | 3/1988 | Benim et al. | 524/451 |
| 4,778,842 | 10/1988 | Taniguchi et al. | 524/504 |
| 4,786,663 | 11/1988 | Miyashita et al. | 524/410 |
| 4,845,169 | 7/1989 | Abu-Isa et al. | 525/444 |

*Primary Examiner*—Paul R. Michl
*Assistant Examiner*—Tae H. Yoon
*Attorney, Agent, or Firm*—Depaoli & O'Brien

[57] ABSTRACT

Talc filled thermoplastic polyester compositions which have been modified by the addition of a butadiene-based impact modifier are stabilized against degradation by the addition thereto of a specific diphenylamine compound.

13 Claims, No Drawings

STABILIZED TALC-FILLED POLYESTER COMPOSITIONS

BACKGROUND OF THE INVENTION

The present invention is directed to talc-filled thermoplastic polyester compositions which have improved stability. In particular, the present invention is directed to stabilizing thermoplastic polyester compositions which contain a talc filler and which are further modified by the incorporation of a butadiene polymer to provide improved impact strength to the polyester Thermoplastic polyesters such as those formed from an aliphatic or cycloaliphatic diol, or mixtures thereof, containing from 2 to about 10 carbon atoms and an aromatic dicarboxylic acid as well as segmented thermoplastic copolyester elastomers have long been known in the art and have been used in the preparation of molded and extruded articles. Such resins can be used alone or in conjunction with fillers or other resins to provide materials having a variety of properties. Thus, it is known to incorporate impact modifiers such as butadiene-based core-shell type impact modifiers into poly($C_2$-$C_4$) alkylene terephthalates. It is also known to add talc to thermoplastic polyester compositions in order to improve the thermal and shrinkage properties of the composition. Examples of adding a talc filler to thermoplastic polyesters are disclosed in U.S. Pat No(s). 3,859,246; 4,421,888 and 4,731,407. It is further well known that thermoplastic polyesters including the segmented copolyester elastomers are subject to thermal degradation and that the unstabilized polymers exhibit poor processing behavior and unacceptable performance, especially at elevated temperatures. A number of antioxidant stabilizers are available for use in these polymers. For example, U.S. Pat. No(s). 4,520,148; 4,520,149 and 4,520,150 disclose stabilizing thermoplastic segmented copolyester elastomers with various stabilizer combinations. It is also well known to include talc into thermoplastic polyester compositions and to stabilize the composition with known antioxidants.

However, it has recently been discovered by the present inventors that the incorporation of talc into thermoplastic polyesters resins, in particular, thermoplastic polyesters resins which have been modified by the incorporation of a butadiene-based impact modifier, causes the degradation of the polyester during processing of the composition. Thus, it has been found that these talc-filled thermoplastic polyester compositions degrade during the mixing of the composition as well as during further processing operations such as during extrusion and injection molding. Unfortunately, the addition of common antioxidants or other stabilizers known to be effective stabilizers for polyester resins do not prevent the degradation of the talc-filled polyester resins which have been modified with the butadiene-based impact modifiers.

Accordingly, it is a primary objective of the present invention to improve the stabilization of talc-filled thermoplastic polyesters. Another object is to improve the stabilization of such talc-filled polyesters which have been further modified with a butadiene-based impact modifier.

SUMMARY OF THE INVENTION

In accordance with the present invention, a stabilized thermoplastic composition is provided which comprises:
a) a thermoplastic polyester;
b) talc;
c) a butadiene-based impact modifier; and
d) between about 0.05 and about 5 wt. % of said composition of a diphenylamine compound of the formula:

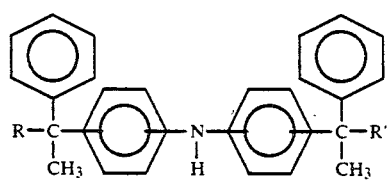

Formula I where R and R' are methyl or phenyl.

DETAILED DESCRIPTION OF THE INVENTION

The polyesters which are suitable for use herein are derived from an aliphatic or cycloaliphatic diol, or mixtures thereof, containing from 2 to about 10 carbon atoms and an aromatic dicarboxylic acid, i.e., polyalkylene terephthalates.

Also contemplated herein are the above polyesters with minor amounts of units derived from aliphatic dicarboxylic acids, e.g., of up to about 50 carbon atoms, including cycloaliphatic straight and branched chain acids, such as adipic acid, cyclohexanediacetic acid, dimerized $C_{16}$-$C_{18}$ unsaturated acids (which have 32 to 36 carbon atoms), trimerized acids, and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5-naphthalene-dicarboxylic acids. The preferred dicarboxylic acid is terephthalic acid or mixtures of terephthalic and isophthalic acid.

Segmented copolyesters can also be used alone or in combination with the polyesters described above. These copolyesters are either commercially available or can be prepared by processes which are well known to those skilled in the art and are described, for example, in U.S. Pat. No(s). 2,465,139 and 3,047,539. Commercially available products include Hytrel ® from Dupont and Riteflex ® from Hoechst Celanese.

Useful segmented thermoplastic copolyester elastomers consist essentially of a multiplicity of recurring long chain ester units and short chain ester units joined head to tail through ester linkages, said long chain units being represented by the formula

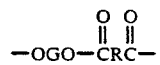

Formula II and said short chain units being represented by the formula

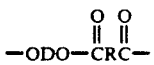

Formula III where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 25 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600 and preferably from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. The chemical structure of the long chain polymeric part of the long chain glycol is not critical and any substituent groups can be present which do not interfere with polymerization of the compound with glycol(s) or dicarboxylic acid(s), as the case may be. The hydroxy functional groups of the long chain glycols which react to form the copolyesters should be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The term "dicarboxylic acid" as used herein is intended to include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers useful herein have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, etc. and $C_1$–$C_{10}$ alkyl and other ring substitution derivatives thereof such as halo, alkoxy or aryl derivatives. Hydroxy acids such as p($\beta$-hydroxyethoxy) benzoic acid can also be used providing an aromatic dicarboxylic acid is also present.

"Aromatic dicarboxylic acids" are dicarboxylic acids in which each carboxy group is attached to a carbon atom in an isolated or fused benzene ring such as those mentioned above. "Aliphatic dicarboxylic acids" are acids in which each carboxy group is attached to a fully saturated carbon atom or to a carbon atom which is part of an olefinic double bond. If the carbon atom is in a ring, the acid is cycloaliphatic, and if not, the acid is aliphatic. Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylene dicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids. are the cyclohexanedicarboxylic acids and adipic acid.

It is important that the dicarboxylic acid have a molecular weight less than about 300 and aromatic acids with 8-16 carbon atoms are preferred. Particularly preferred are the phenylene dicarboxylic acids such as terephthalic and isophthalic acid. The acid molecular weight requirement pertains to the acid itself and not to its ester or ester-forming derivative. Thus, the ester of a dicarboxylic acid having a molecular weight greater than 300 is included in this invention provided the acid has a molecular weight below about 300.

Included among the low molecular weight (less than about 250) diols which react to form short chain ester units of the copolyesters are acyclic, alicyclic and aromatic dihydroxy compounds. Preferred are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided however, that the molecular weight requirement pertains to the diol only and not to its derivatives.

Long chain glycols which can be used in preparing the polymers useable in the compositions of this invention include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide HOOCCH$_2$(OCH$_2$CH$_2$CH$_2$CH$_2$)$_x$-OCH$_2$COOH IV can be used to form long chain glycols in situ, as discussed below. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylene diene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure

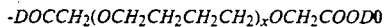

$$-DOCCH_2(OCH_2CH_2CH_2CH_2)_xOCH_2COOD0 \qquad V$$

when only one low molecular weight diol (corresponding to D) is employed. When more than one diol us used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

The talc filler used in the compositions of the invention is employed in a finely divided form and the particle size may vary widely as, for instance, from about 0.01 to about 1,000 microns with the preferred particle size being less than about 50 microns. The particle may also assume any naturally existing or desired shape as, for instance, acicular, fibrous, flat platelet, etc.

Butadiene-type core-shell polymers suitable for use as the impact modifier in compositions of the invention are well known and are described for instance in U.S. Pat. No. 4,180,494, the disclosure of which is incorporated herein by reference. Such butadiene based core-shell polymers preferably involve a graft copolymer formed between a butadiene polymer core whose butadiene units account for at least 50 mole % of the total polymer and at least one vinyl monomer such as a derivative of acrylic or methacrylic acid. In preferred embodiments, more than one vinyl monomer is grafted to the butadiene rubber; for example a preferred copolymer is a three-stage polymer having a butadiene based rubbery core, a second-stage polymerized from styrene and a final stage or shell polymerized from methylmethacrylate and 1,3-butylene glycol dimethacrylate.

Butadiene type core-shell modifiers suitable for use in compositions of the invention are available for instance from Rohm and Haas Company under the tradename PARALOID KM-653 ® and from M & T Chemicals under the designation METABLEN C-223 ®.

Block copolymers of butadiene and vinyl aromatic hydrocarbons may also be utilized as the impact modifier and include any of those which exhibit elastomeric properties. Such block copolymers may be multiblock copolymers of varying structures containing various ratios of butadiene to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A-B, A-B-A, A-B-A-B, B-A-B, (AB)$_{1,2,3}$... BA and the like wherein A is a polymer block of vinyl aromatic hydrocarbon or a conjugated diene/vinyl aromatic hydrocarbon tapered copolymer block and B is a polymer block of butadiene.

The block copolymers may be produced by any well known block polymerization or copolymerization procedure including the well known sequential addition of monomer techniques, incremental addition of monomer technique or coupling technique as illustrated in, for example, U.S. Pat. No. 3,251,905; 3,390,207; 3,598,887 and 4,219,627. Various patents describe the preparation of multiblock copolymers containing tapered copolymer blocks including U.S. Pat. No. 3,251,905; 3,265,765; 3,639,521 and 4,208,356 the disclosures of which are incorporated herein by reference.

The butadiene block includes 1,3-butadiene, 2-methyl-1,3-butadiene (isoprene), 2,3-dimethyl,-1,3-butadiene, and the like. Mixtures may also be used. Preferred is 1,3-butadiene.

Vinyl aromatic hydrocarbons which may be utilized to prepare copolymers included styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer. Useful block copolymers include KRATON ® rubbers from Shell.

The block copolymers are typically hydrogenated prior to incorporation into the polyesters. The hydrogenation of these polymers and copolymers may be carried out by a variety of well established processes including hydrogenation in the presence of such catalysts as Raney Nickel, noble metals such as platinum, palladium and the like and soluble transition metal catalysts. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

The block copolymers may also be grafted such as with maleic anhydride as is well known in the art.

The compositions of this invention will typically comprise the polyester component in amounts of about 50 to about 90 wt. % based on the composition. The polyester component can comprise either of the polyesters formed by the reaction of aliphatic glycols with aromatic dicarboxylic acids or the segmented copolyester elastomers alone or in admixture. If a mixture is used, a wide range of amounts for each of the polyester components can be utilized depending upon the desired flexibility. The talc filler can be added for a wide variety of purposes including nucleating agent, improvement of shrinkage properties and, to improve the thermal properties of the composition, in particular, the heat deflection temperature (HDT) of the composition. The talc filler is added typically in amounts of from about 1 to 25 wt. %, preferably about 4-25% based on the composition. The butadiene-based impact modifier is typically added in amounts of from about 5 to about 30 wt. % based on the composition.

Added to the above composition in stabilizing amounts is the diphenylamine compound of Formula I. Preferably, the diphenylamine compound of Formula I will be added in amounts of 0.05 to about 5 wt. % based on the composition and, more preferably, from about 0.1 to about 3 wt. %.

The essential and optional ingredients of the compositions of the present invention are preferably added by blending with the previously polymerized polyester. All such ingredients or portions thereof may, however, be present during polymerization of the polyester so long as the polymerization reaction is not interfered with. Blending with the polyester may be carried out in any suitable manner such as in conventional mixing equipment with extrusion compounding being preferred.

The polyester compositions of the invention may be shaped into a variety of articles. For example, the compositions may be extruded into rods or bars, pelletized or shaped into an article. Any of the well-known shaping methods such as the conventional molding techniques may be used as, for example, injection molding, compression molding and the like.

If desired, the compositions of the invention may also include nucleating agents, pigments, glass fibers, other fillers besides talc, lubricants and other additives such as fire retardant agents.

The following examples are included to further illustrate the present invention.

EXAMPLE 1

This example studies talc addition to modified polyester compositions.

The formulations used to compare unfilled and talc filled samples are shown in Table 1 as weight %.

TABLE 1

|  | SAMPLE A | SAMPLE B |
| --- | --- | --- |
| PBT (0.75 IV) | 25.0 | 22.5 |
| Segmented copolyester[1] | 55.0 | 49.5 |
| MBS[2] Modifier | 20.0 | 18.0 |
| Talc | — | 10.0 |

[1] Riteflex 547
[2] Methacrylic-butadiene-styrene core shell impact modifier

In the data tables of this and following examples, VISCOSITY and VISCOSITY RETENTION are listed as measured properties of the compounds. The definition of these terms is shown below:

1. Viscosity was measured at 475° F. and 1000 sec$^{-1}$ on samples produced from the compounding step. The viscosity of a compounded sample relative to the unfilled control is a measure of degradation caused by the talc. The viscosity of stabilized samples relative to the viscosity of the unstabilized talc control is a measure of stabilizer effectiveness in a talc filled sample.

2. Viscosity retention was measured at 475° F. and 1000 sec$^{-1}$ and is the percent retention of the original viscosity after the samples have been heated at 475° F. for 20 minutes. Viscosity retention is a measure of the sample's resistance to degradation during processing after the sample is compounded.

The samples were prepared by extrusion compounding in a twin-screw extruder at 250° C. at 200 rpm.

The data in Table 2 demonstrates the degradation caused by talc addition to polyester formulations. This degradation is characterized by a decrease in VISCOSITY during the compounding (or melt mixing) step when talc is incorporated into the polyester compound as well as a decrease in VISCOSITY RETENTION after the talc-filled product is heated at 475° F. for 20 min.

TABLE 2

| SAMPLE | VISCOSITY (POISE) | VISCOSITY RETENTION (%) |
| --- | --- | --- |
| A | 1359 | 83 |
| B | 1176 | 75 |

From Table 2, it can be seen that talc causes degradation during compounding (or melt mixing) because the viscosity of the talc-filled sample was lower than the unfilled sample. The post-compounded product also degraded inasmuch as percent viscosity retention of talc-filled product was lower than the unfilled sample.

EXAMPLE 2

A series of polyester blends were formulated to test the effect that talc and a variety of known stabilizers and anti-oxidants had on viscosity and viscosity retention properties. All samples were formulated as in Example 1. The formulations and results are tabulated in Table 3.

Table 3 illustrates that commonly used anti-oxidants and synergists did not prevent the talc-induced degradation of the polyester. IRGANOX 1010 and 3125 are common anti-oxidants that are known to be effective stabilizers for thermoplastic polyester resins containing MBS modifiers. A stabilizer blend of 1 part of IR-GANOX 1010 to two parts phosphite is also known to stabilize thermoplastic polyester resins containing MBS modifiers. The anti-oxidant and synergist stabilized samples were either lower than or equivalent to the unstabilized talc-filled formulation (Sample B) in viscosity or viscosity retention

TABLE 3

| SAMPLE | A | B | C | D | E | F |
|---|---|---|---|---|---|---|
| PBT | 25 | 22.5 | 22.5 | 22.5 | 22.5 | 22.5 |
| Segmented copolyester[1] | 55 | 49.5 | 49.5 | 49.5 | 49.5 | 49.5 |
| MBS Modifier | 20 | 18.0 | 18.0 | 18.0 | 18.0 | 18.0 |
| Talc | — | 10.0 | 10.0 | 10.0 | 10.0 | 10.0 |
| Stabilizer Blend[2] | — | — | +0.3 | +0.6 | — | — |
| Irganox 1010[3] | — | — | — | — | +0.6 | — |
| Irganox 3125[4] | — | — | — | — | — | +0.6 |
| Viscosity, Poise | 1359 | 1176 | 935 | 897 | 1170 | 1193 |
| Viscosity Retention - % | 83 | 75 | 69 | 73 | 80 | 76 |

[1]Riteflex 547
[2]1 part Irganox 1010 + 2 parts tris(2,4 di-tert-butylphenyl)phosphite
[3]Tetrakis[methylene(3,5 di-tert-butyl-4-hydroxy-hydrocinnamate)]methane
[4]Tradename for 3,5-di-tert-butyl-4-hydroxyhydrocinnamic acid triester with 1,3,5-tris-(2-hydroxyethyl)-s-triazine-2,4,6-(1H, 3H, 5H)trione The data in Table 3 demonstrates that neither the anti-oxidants nor the synergists stabilize the talc-filled compounds.

EXAMPLE 3

It was found that the diphenylamine stabilizer of Formula I resists the degradation caused by talc. The stabilizing effect of this additive is shown in Table 4. Sample G was produced by adding the stabilizer in the stated amount to Sample B of Table 3.

TABLE 4

| SAMPLE | VISCOSITY (POISE) | VISCOSITY RETENTION (%) |
|---|---|---|
| A Unfilled | 1359 | 83 |
| B Talc-filled | 1176 | 75 |
| L 0.6% Naugard 445[1] | 1235 | 83 |

[1]Tradename of diphenylamine compound of Formula I.

Substantial improvement in resistance to degradation during compounding as well as improvement in viscosity retention was found by the stabilizer system in Table 4.

In light of the data in Table 3 which demonstrated that common anti-oxidants and synergists did not prevent talc-induced degradation, it was quite unexpected that the additive shown in Table 4 provided resistance to the degradation caused by talc.

What is claimed is:

1. A stabilized thermoplastic composition comprising:
   a) a thermoplastic polyester containing a blend of (i) one or more polyesters formed by the reaction of an aliphatic or cycloaliphatic diol or mixtures thereof and an aromatic dicarboxylic acid and (ii) one or more segmented copolyester elastomers;
   b) talc;
   c) a butadiene-based impact modifier; and
   d) a stabilizing amount of a diphenylamine compound the formula:

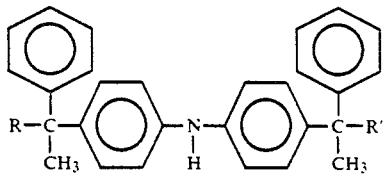

where R and R' are methyl or phenyl.

2. A composition of claim 1 wherein said diphenylamine compound is present in amounts of from about 0.05 to about 5 wt. % based on the composition.

3. The composition of claim 1 wherein said aromatic dicarboxylic acid is terephthalic acid, isophthalic acid or a mixture thereof.

4. The composition of claim 1 wherein said polyester (i) comprises a polyalkylene terephthalate.

5. The composition of claim 4 wherein said polyester (i) comprises polybutylene terephthalate, polyethylene terephthalate or mixtures thereof.

6. The composition of claim 1 wherein said polyester (i) comprises a blend of PET or PBT or mixture thereof with a polyester formed by reaction of ethylene glycol and either cyclohexane-diol or neopentyl glycol with terephthalic acid.

7. The composition of claim 1 wherein said thermoplastic polyester is present in amounts of from about 50 to 90 wt. %, said talc is present in amounts of from about 1 to 25 wt. % and said butadiene-based impact modifier is present in amounts from about 5 to 30 wt. % based on the composition.

8. The composition of claim 3 wherein said butadiene-based impact modifier is an MBS core-shell copolymer.

9. The composition of claim 8 wherein said diphenylamine is present in amounts of from about 0.1 to 3 wt. % of said composition.

10. The composition of claim 1 wherein said segmented copolyester elastomer (ii) is formed from long units of poly(ethylene oxide)glycol, poly(propylene oxide)glycol, block copolymers of poly(propylene oxide) glycol and poly(ethylene oxide) glycol, or poly(tetramethylene oxide)glycol and terephthalic acid and short units derived from 1,4-butane diol; 1,4-butene diol or a mixture thereof with terephthalic acid.

11. The composition of claim 1 wherein said thermoplastic polyester a) comprises a mixture of (i) a polyester comprising PET, PBT or mixtures thereof and (ii) a segmented copolyester elastomer formed from poly(ethylene oxide)glycol, poly(propylene oxide)glycol, block copolymers of poly(propylene oxide) glycol and poly(ethylene oxide) glycol, or poly(tetramethylene oxide)glycol and terephthalic acid and short chain units derived from 1,4-butane diol; 1,4-butene diol or mixtures thereof with terephthalic acid.

12. A stabilized thermoplastic composition comprising:
   a) about 50 to 90 wt. % of a thermoplastic polyester containing a blend of (i) one or more polyesters formed by the reaction of an aliphatic or cycloaliphatic diol or mixtures thereof and an aromatic dicarboxylic acid and (ii) one or more segmented copolyester elastomers;
   b) about 1 to 25 wt. % talc;
   c) about 5 to 30 wt. % of a butadiene-based impact modifier; and d) between about 0.05 and about 5 wt. % of said composition of a diphenylamine compound of the formula:
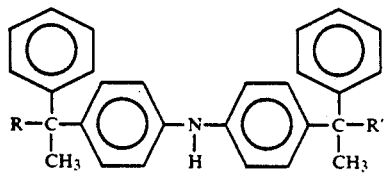
where R and R' are methyl or phenyl.
13. The composition of claim 8 wherein said butadiene-based impact modifier is an MBS core-shell copolymer.
* * * * *